Patented Jan. 16, 1951

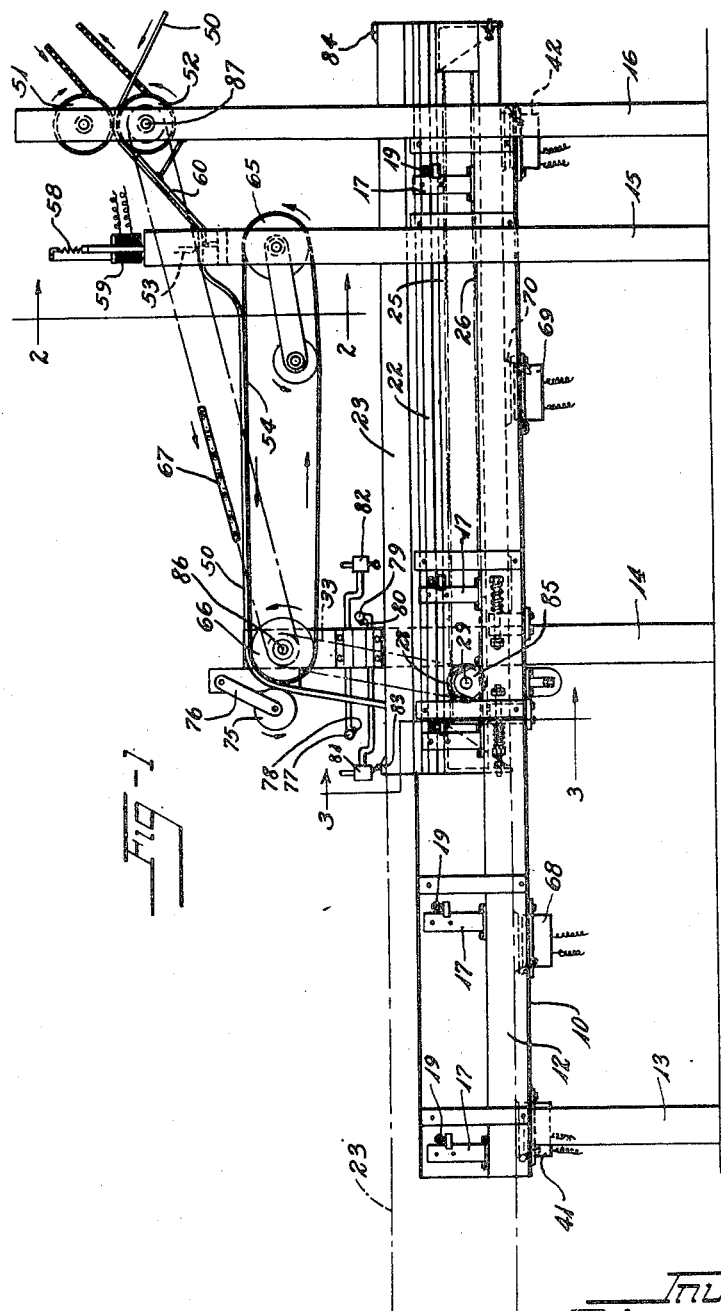

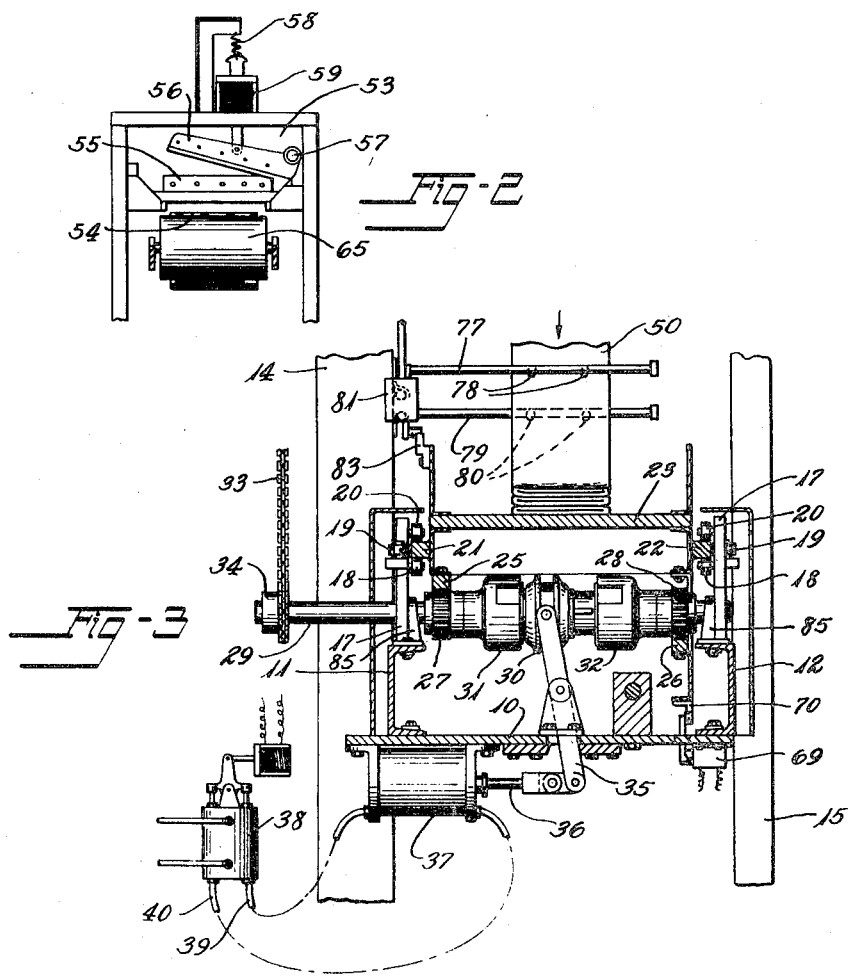

2,538,191

UNITED STATES PATENT OFFICE 2,538,191

APPARATUS FOR CUTTING AND STACKING STRIP MATERIAL

Edward A. Davis, Akron, Ohio, assignor to The B. F. Goodrich Company, New York, N. Y., a corporation of New York Application November 12, 1948, Serial No. 59,507

3 Claims. (Cl. 164—42)

This invention relates to the cutting and stacking of strip material and is especially useful in cutting thin walled rubber tubing such as is used in manufacturing rubber bands although the invention is also useful in cutting and stacking other flexible strip material.

Heretofore, in the manufacture of rubber bands, a strip of thin unvulcanized rubber or other rubber-like material has been formed by a continuous process to tubular form and its margins seamed together. The tubular strip has then been cut to lengths suitable for handling in the vulcanizer and the lengths are vulcanized. Thereafter the lengths of tubing have been fed through a cutting machine which cuts them into very short lengths suitable for use as rubber bands.

It is an object of the present invention to prepare the strip material for the vulcanizing operation by cutting it to desired lengths and stacking the lengths.

This and other objects will appear from the following description and the accompanying drawings.

Of the drawings,

Fig. 1 is a side elevation of apparatus constructed in accordance with and embodying the invention.

Fig. 2 is a cross sectional view thereof taken on line 2—2 of Fig. 1.

Fig. 3 is a cross-sectional view thereof taken on line 3—3 of Fig. 1.

Referring to the drawings, the numeral 10 designates a bed plate having parallel horizontal channel bars 11, 12 secured thereto along its margins. The bed plate is supported parallel to the floor by posts 13, 14, 15, 16 at one side thereof and similar posts at the opposite side thereof. A series of brackets 17 are mounted upon the channels 11, 12 and are provided with free running rollers 18, 19, 20 for retaining parallel rails 21, 22 of a carriage 23.

The carriage 23 has a plurality of racks 25, 26 mounted thereon for meshing with pinions 27, 28. The pinions are freely rotatable about a shaft 29 extending across the bed plate 10 and journaled in bearings 85 secured to channels 11 and 12. Rack 25 engages the upper side of pinion 27 and rack 26 engages the lower side of pinion 28. A clutch member 30 is slideably mounted on shaft 29 between clutch members 31, 32 secured to pinions 27, 28 respectively. Shaft 29 is driven from shaft 86 through chain 33 by engaging a sprocket 34 on the shaft. The arrangement is such that with the shaft 29 running in one direction, the carriage 23 may be reciprocated by engaging the clutch alternately with pinions 27, 28.

For operating the clutch, a rocking shifter lever 35 is pivotally mounted on bed plate 10 and one end engages clutch member 30. The other end is pivotally connected to the piston rod 36 of a double acting fluid pressure cylinder 37 mounted on the base plate 10. A four-way solenoid operated valve 38 is connected to cylinder 37 by pipes 39, 40. A limit switch 41 is mounted at one end of the channel 12 and a limit switch 42 is mounted at the opposite end. The arrangement is such that when the carriage approaches one end of the apparatus it contacts switch 41 engaging the solenoid of valve 38 to reverse the clutch 30 and drive the carriage in the opposite direction until the carriage operates switch 42 to again reverse it.

The strip material 50 is delivered by a pair of driven squeeze rollers 51, 52 to a cut-off shear 53 and, from there, the cut strips are delivered over a conveyor belt 54 to a midposition of the apparatus just described. The shear has a stationary blade 55 and a moveable blade 56 hinged thereto, as at 57. The blades are normally held open by a spring 58 and for performing a cutting operation the moveable blade 56 may be lowered by a solenoid 59. The strip material is guided between the blades by an inclined table 60.

The conveyor belt 54 is mounted about pulleys 65, 66. Pulley 66, which is fixed to shaft 86, is driven by a chain 67 engaging a sprocket on shaft 86 and driven by a shaft 87 to which roll 52 is secured. Shaft 86 also drives chain 33 to oscillate the table 23.

For operating the knife blade 56, a limit switch 68 is secured to bed plate 10 and well spaced from the adjacent end thereof and a similar switch 69 is mounted well spaced from the other end, the spacing between the switches being equal to the desired length of the cut strips or equal to the length of the carriage 23. The switches are adjustable along the bed plate. A switch operating cam 70 is mounted on the carriage 23 in position to close the switches during movement of the carriage. Switches 68, 69 are in the control circuit of solenoid 59. The arrangement is such that at each end of movement of the carriage 23 one of the switches 68, 69 is closed, engaging the solenoid to cut the strip 50.

The cut strips travel over pulley 66 and are deflected downwardly by a roller 75 mounted to swing on an arm 76, pivotally mounted on post 14. To deflect the leading ends of the strip in the direction of travel of the carriage 23 and cause them to lay properly, a pipe 77 extends across the frame and has air jets 78 thereon directed to the right in Fig. 1, and a similar pipe 79 has air jets 80 directed in the opposite direction. The pipes 77, 79 are supplied with compressed air from a convenient source (not shown) through lever operated normally closed valves 82, 81 respectively. Air valve 81 is normally closed and is opened by a cam 83 when the carriage 23 is at the extreme right, as seen in Fig. 1 and blows air from pipe 79 to the left to deflect the leading end of the strip 50 to the left to cause it to deflect toward the end of the carriage as the carriage starts its travel toward the left. Valve 82 is similarly operated by a cam 84 and opens when the carriage is at the extreme left in Fig. 1 to cause the jets of pipe 77 to blow to the right to deflect the leading end to the right as the carriage starts its travel to the right.

The operation of the apparatus is as follows: The strip material 50 is fed continuously between rollers 51, 52 and over guide 60 through the cutting blades. The carriage 23 reciprocates constantly and as the switches 68, 69 are closed by cam 70 the knives cut the strip 50 to lengths which are conveyed over conveyor 54 in succession. As the leading end of a strip passes from the conveyor the carriage reverses direction of travel and the air jets blow the leading end in the new direction of travel of the carriage. The strips are received by the carriage and stacked thereon with the ends of the strips aligned with the ends of the carriage.

When the carriage is full, the operator removes the strips as a bundle.

Variations may be made without departing from the scope of the invention as it is defined by the following claims.

I claim:

1. Apparatus for cutting and stacking strip material, said apparatus comprising a reciprocating carriage, means for feeding a continuous strip of material, toward said carriage, means responsive to movements of said carriage for cutting the strip into lengths as it is advanced toward said carriage, and means for depositing the cut lengths of material on said carriage, said last-named means including air jets for deflecting and leading ends of the strips and means for operating said jets alternately in opposite directions corresponding to the direction of travel of said carriage at the time the leading end approaches said carriage.

2. Apparatus for cutting and stacking strip material, said apparatus comprising a reciprocating carriage, means for feeding a continuous strip of material, means in the path of the strip for cutting lengths therefrom during advance of the strip, said cutting means being controlled by movement of said carriage, and means for depositing the cut lengths of material on said carriage, said last-named means including air jets for deflecting the leading ends of the strips alternately in opposite directions corresponding to the direction of travel of said carriage at the time the leading end approaches said carriage, said air jets being controlled in their operation by movement of said carriage.

3. Apparatus for feeding and stacking strips of material, said apparatus comprising a reciprocating carriage for receiving the strips in succession, means for delivering the leading edges of said strips in succession at the two extremities of travel of the carriage, and means controlled by movement of the carriage for deflecting the leading ends of the strips alternately in opposite directions corresponding to the direction of travel of said carriage, said means comprising air jets directed against the leading end of the strips and valves controlling supply of air under pressure to said jets, said valves being controlled by cams on said carriage.

EDWARD A. DAVIS.

REFERENCES CITED

The following references are of record in the file of this patent:

UNITED STATES PATENTS

| Number | Name | Date |
| --- | --- | --- |
| 141,314 | Braidwood et al. | July 29, 1873 |
| 1,060,450 | Hamilton | Apr. 29, 1913 |
| 1,270,334 | Schumacher | June 25, 1918 |
| 1,475,802 | Dorman | Nov. 27, 1923 |
| 1,873,316 | Droitcour | Aug. 23, 1932 |

FOREIGN PATENTS

| Number | Country | Date |
| --- | --- | --- |
| 413,817 | France | Aug. 19, 1910 |